(12) United States Patent
Wakahara

(10) Patent No.: US 6,314,254 B1
(45) Date of Patent: *Nov. 6, 2001

(54) OPERATION UNIT, AND AN IMAGE FORMING APPARATUS INCLUDING THE OPERATION UNIT

(75) Inventor: Shinichiro Wakahara, Numazu (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/325,561

(22) Filed: Jun. 4, 1999

(30) Foreign Application Priority Data

Jun. 16, 1998 (JP) .................................................. 10-183251
Apr. 27, 1999 (JP) .................................................. 11-119626

(51) Int. Cl.⁷ .................................................. G03G 15/00
(52) U.S. Cl. .............................. 399/81; 399/107; 399/110
(58) Field of Search ............................... 399/1, 2, 81, 88, 399/3, 107, 110; 347/111, 112, 152

(56) References Cited

U.S. PATENT DOCUMENTS

| | | | |
|---|---|---|---|
| 5,091,746 | * | 2/1992 | Watanabe ........................ 399/1 X |
| 5,488,453 | * | 1/1996 | Labudde et al. .................. 399/1 |
| 5,493,365 | * | 2/1996 | Matsui et al. .................... 399/1 |
| 5,543,897 | * | 8/1996 | Altrieth, III ..................... 399/81 |

FOREIGN PATENT DOCUMENTS 6-320836   11/1994   (JP) .
10-243138   9/1998   (JP) .

* cited by examiner

Primary Examiner—Sandra Brase
(74) Attorney, Agent, or Firm—Fitzpatrick, Cella, Harper & Scinto

(57) ABSTRACT

An operation unit is detachably mountable on any one of an image forming unit and an image reading unit, and an image forming apparatus includes such an operation unit, the image forming unit and the image reading unit. The operation unit common to the image forming unit and the image reading unit can be used, so that it is possible to provide a copier configuration having an excellent operability in accordance with the operator's conditions. Furthermore, it is possible to provide various configurations, a printer configuration and the like, with a low production cost.

10 Claims, 14 Drawing Sheets

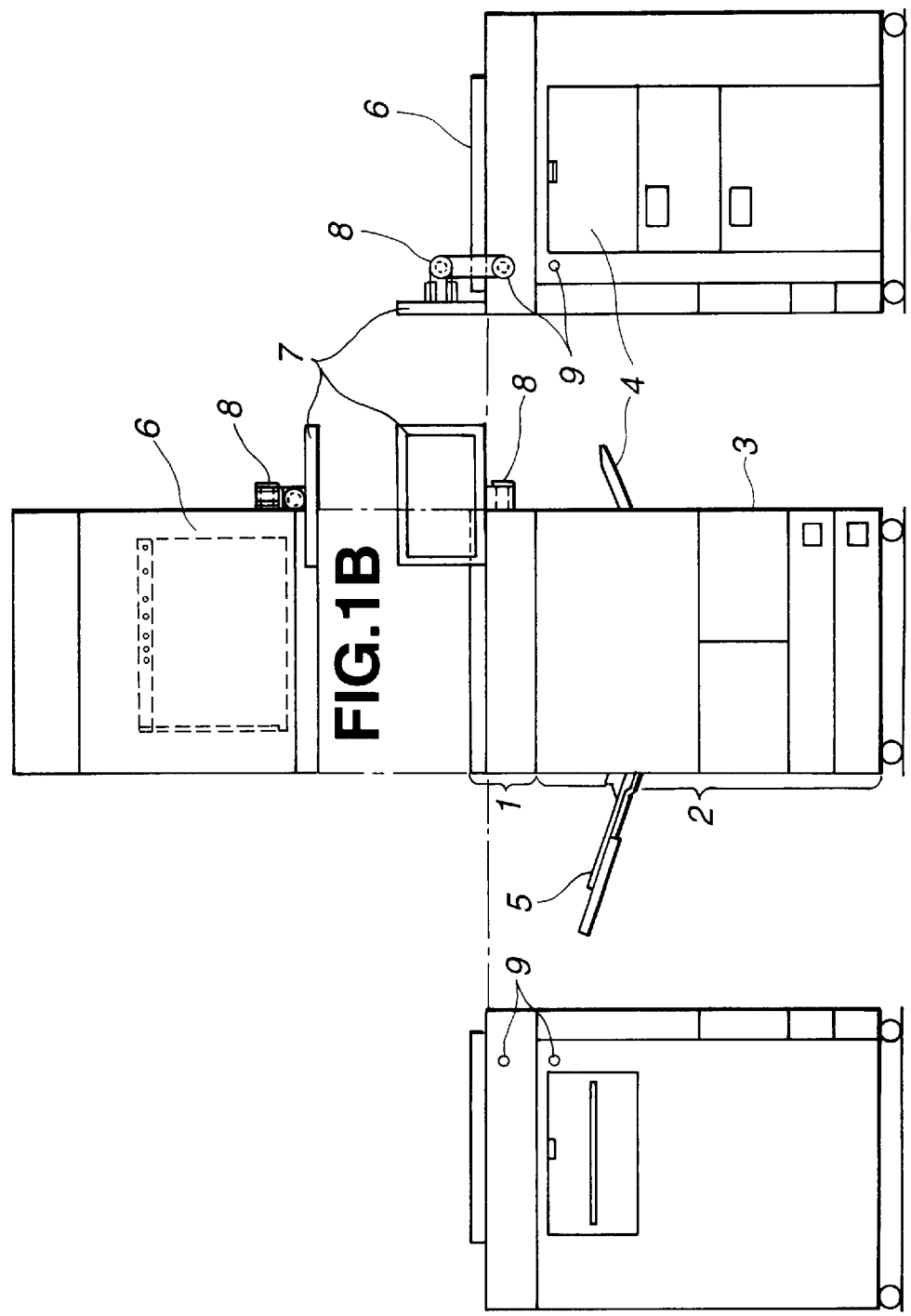

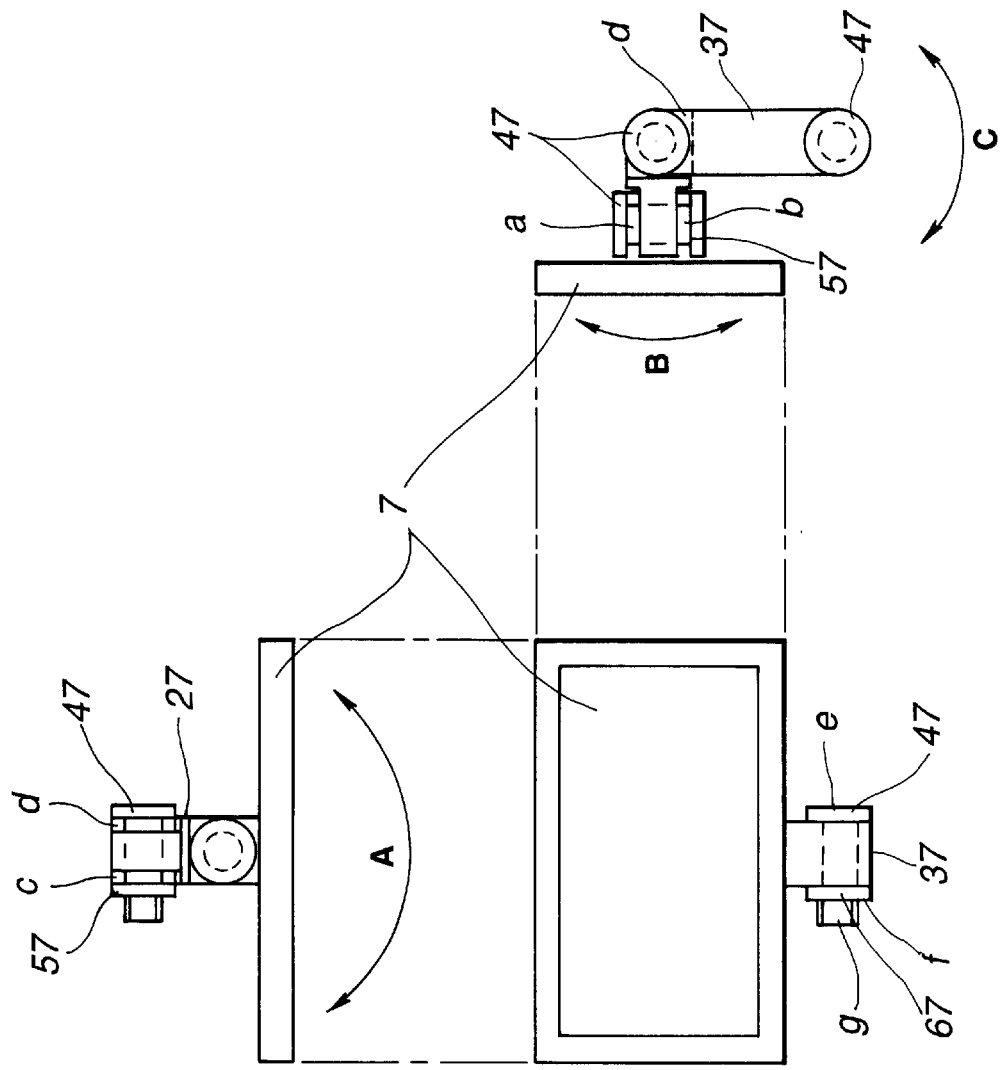

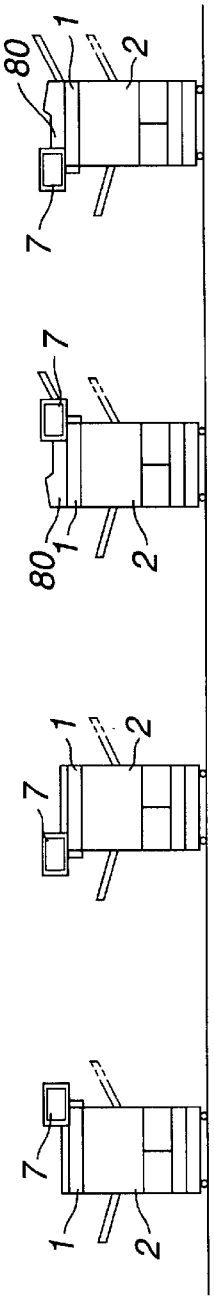
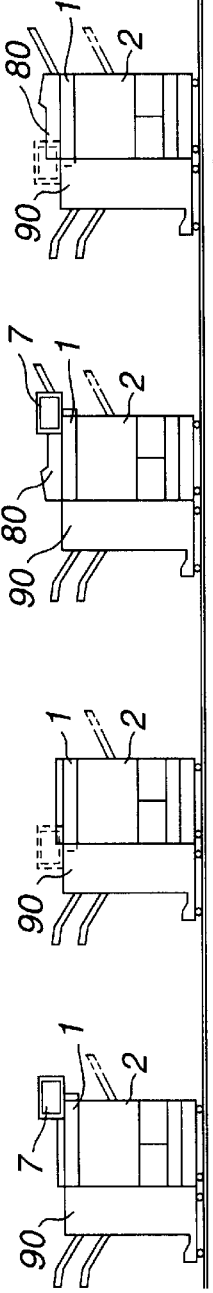
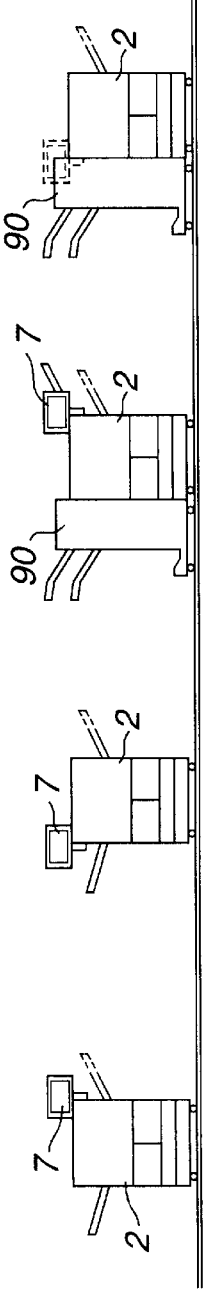
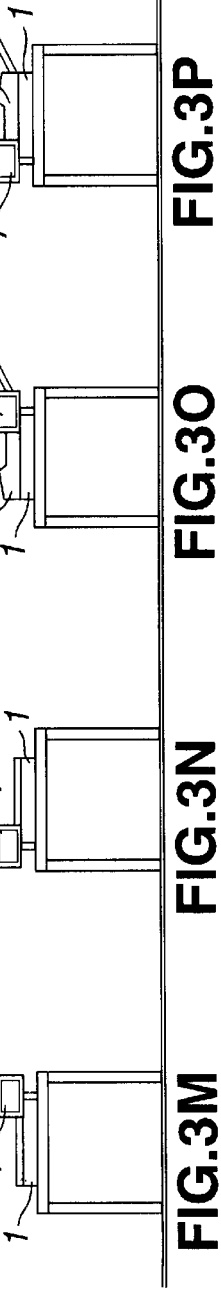

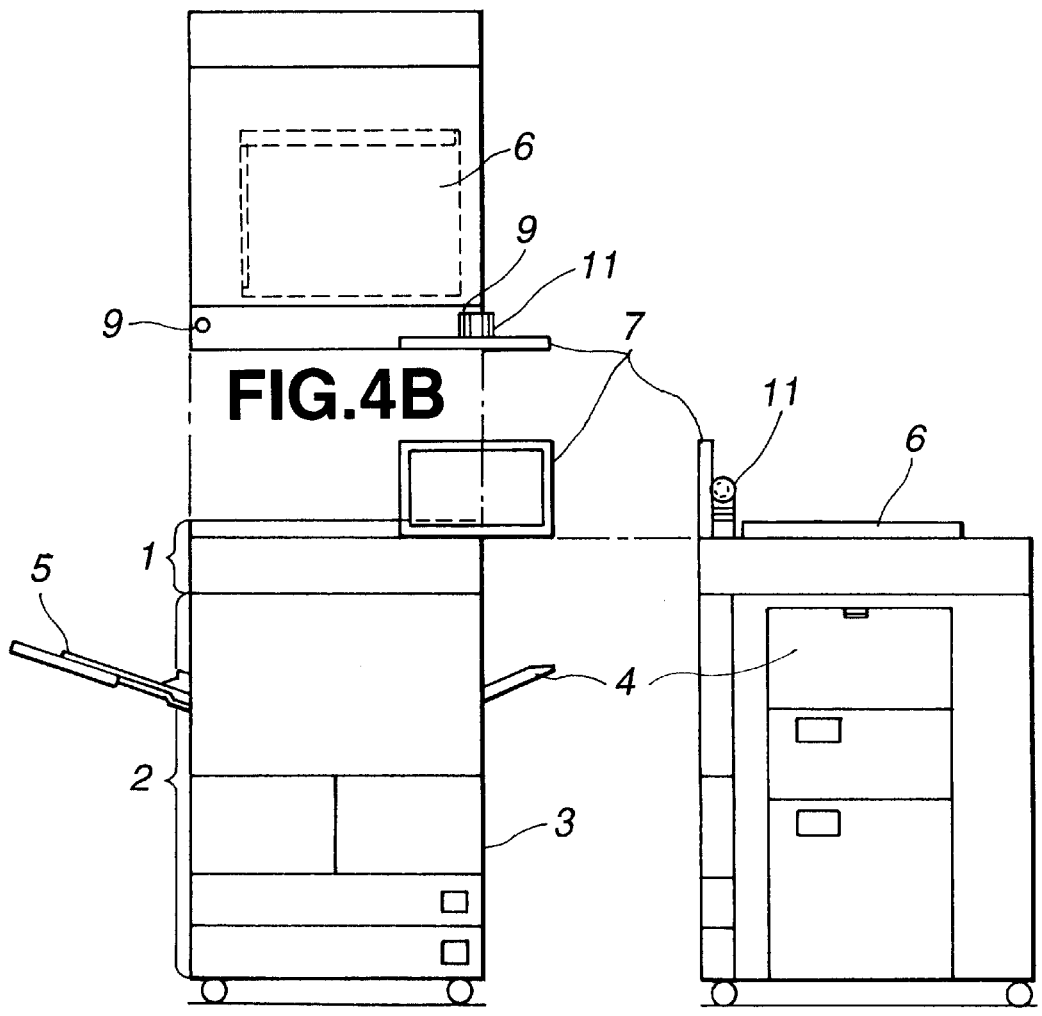
FIG.4A   FIG.4C

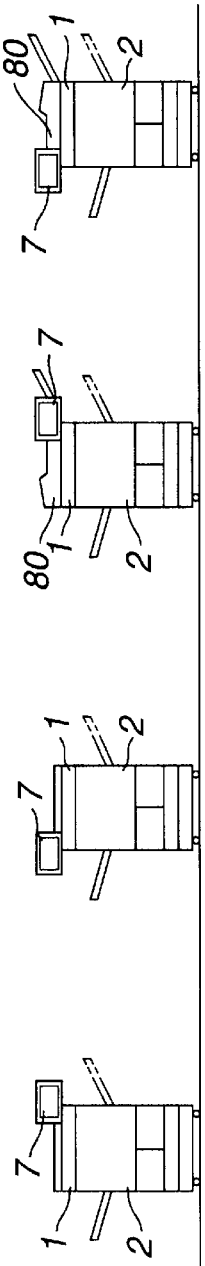
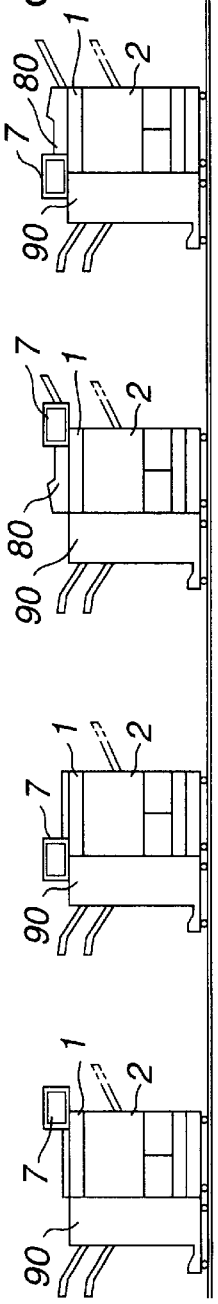
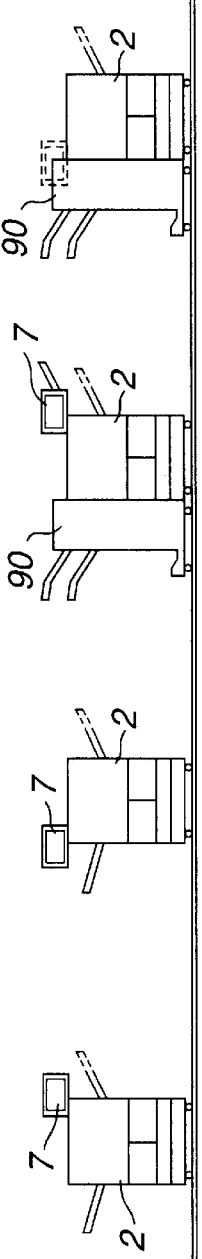
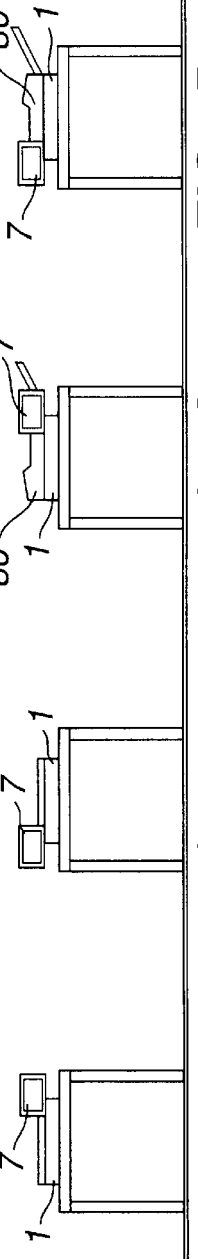

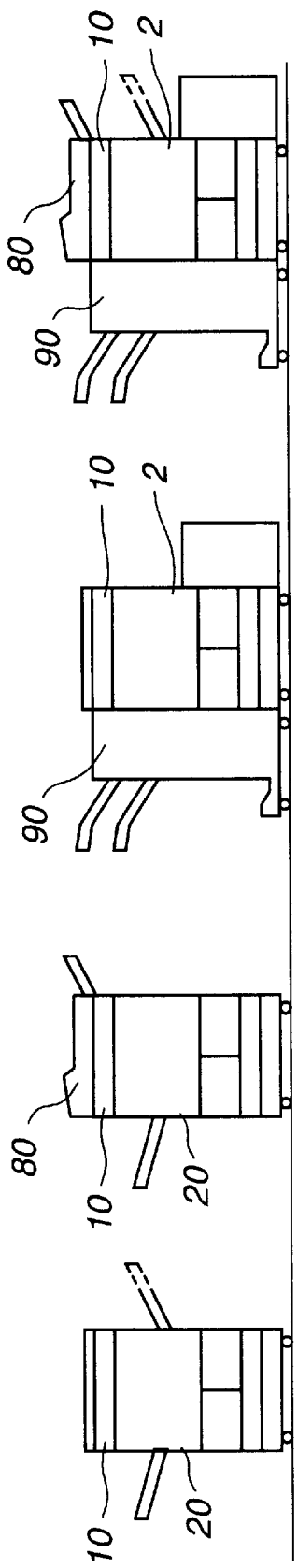

OPERATION UNIT, AND AN IMAGE FORMING APPARATUS INCLUDING THE OPERATION UNIT

BACKGROUND OF THE INVENTION

1. Field of the Invention

The present invention relates to an image forming apparatus operated according to an operation instruction signal from an operation unit.

2. Description of the Related Art

Conventional copiers, serving as one type of image forming apparatus, have been used widely and generally include an image reading unit on which an original is mounted, an image forming unit disposed below the image reading unit, and an operation unit fixed on the image reading unit.

A description will now be provided of the arrangement of the respective units, i.e, the image reading unit, the image forming unit and the operation unit, constituting the image forming apparatus having the above-described configuration with reference to FIG. 7. FIG. 7 is composed of a top plan view, a side view as seen from the operator, and a side view as seen from the sheet feeding side of the image forming apparatus. Since the internal configuration of each of the units is the same as that of a well-known image forming apparatus, further description thereof will be omitted.

When an original-pressing plate 60 provided on the top surface of the image forming apparatus is opened, an original is mounted on a platen-glass, and the apparatus is driven, an image reading unit 10 operates, and image information representing an image on the original is output. An image is formed on a recording material by an image forming unit 20 provided at a lower portion of the apparatus, based on the image information.

As is well known, in the image forming unit 20, an image is formed on a separately supplied recording material according to the operations of an image bearing member (not shown), and charging means, developing means, transfer means and the like disposed around the image bearing member. The recording material having the image formed thereon is discharged onto a discharged-sheet tray 50. Reference numeral 30 represents a sheet feeding cassette unit for accommodating sheets of the recording material, and reference numeral 40 represents a manual sheet feeding unit.

The operator instructs operations, such as on/off of the apparatus, selection of a copying mode, and the like, through an operation unit 70 mounted on the image reading unit 10. The operation unit 70 includes an operation display panel for displaying the above-described various operations, jam removing processing, and the like.

A description will now be provided of the actual state of use of the image forming apparatus with reference to FIGS. 8A–8C. FIG. 8A illustrates a configuration in which the apparatus is used as a copier by stacking the image reading unit 10 and the image forming unit 20 (a standard configuration). FIG. 8B illustrates a configuration in which the apparatus is used as a printer by removing the image reading unit 10 and connecting the image forming unit 20 to the output side of a computer. FIG. 8C illustrates a configuration in which the apparatus is used as an image reading apparatus for outputting image information from the image reading unit 10 to an external apparatus, such as a computer, a printer or the like.

By detachably mounting an automatic original-feeder 80 and/or a sorter 90 for classifying copies discharged to the outside of the apparatus on the image forming apparatus, the image forming apparatus can be used, for example, in a configuration in which the automatic original-feeder 80 is added to the standard configuration, in a configuration in which the sorter 90 is added to the standard configuration, and in a configuration in which the automatic original-feeder 80 and the sorter 90 are added to the standard configuration as shown in FIGS. 9A–9D.

In the above-described image forming apparatus, higher operational functions are being demanded in accordance with recent development in the image processing technique, and provision of network environment. In one of these functions, it is intended to improve operability in image processing by providing the same level of visibility and operability as in a manual operation by performing preview display.

However, if preview display is performed on a conventional display unit having a size of about 5 inches, since image processing is performed for a reduced pseudo-original, problems may arise in visibility and operability for detailed portions. A larger display unit is also preferable from the viewpoint of being adapted to an increase in the number of operational picture frames, operation buttons or the like required as a result of provision of higher functions to be added in accordance with development of a network configuration.

When the size of the display unit is increased, the size of a front portion of the apparatus where the operator is present is also increased, resulting in an increase in the distance between the operator and a portion where an original is to be mounted, and a degradation in operability. If the operation unit is inclined so as to extend to a lower front portion of the apparatus, the operation unit is over-lapped with the image forming unit, resulting in degradation in the jam removing capabillity and maintenance capability of the image forming unit.

Furthermore, conventionally, when it is intended to use an image forming unit of a copier configuration for a printer configuration or for a reader configuration, it is necessary to provide an operation unit for the printer configuration or the reader configuration separately from an operation unit for the copier configuration, resulting in an increase in the production cost.

Japanese Patent Laid-Open Application (Kokai) No. 6-320836 (1994) discloses a printer in which an operation panel is detachably mounted, and a position where the operation panel is mounted can be changed in accordance with the direction of installation of the printer.

Japanese Patent Laid-Open Application (Kokai) No. 10-243138 (1998) discloses a configuration in which an operation display device is detachably mounted on an image reading apparatus so that the operation display device can be purchased as an optional device.

However, even if the configuration disclosed in Japanese Patent Laid-Open Application (Kokai) No. 6-320836 (1994) or 10-243138 (1998) is adopted, an operation unit for a printer configuration and an operation unit for a copier configuration (operation units for instructing respective operations for an image reading unit and an image forming unit) are separately provided, thereby causing an additional cost.

SUMMARY OF THE INVENTION

It is an object of the present invention to provide an image forming apparatus in which an operation unit is commonly used for a printer configuration and a copier configuration in order to reduce production cost.

It is another object of the present invention to provide an image forming apparatus in which a position where an operation unit capable of performing a copying operation is mounted can be determined in accordance with conditions of an operator.

It is still another object of the present invention to provide an image forming apparatus in which an image reading unit can be operated through an operation unit mounted on an image forming unit.

According to one aspect of the present invention, an operation unit for operating an image reading unit for reading an image on an original and outputting image information representing the read image, and an image forming unit for forming an image on a recording material based on the image information includes a connection unit connectable to any one of the image reading unit and the image forming unit.

According to another aspect of the present invention, an image forming apparatus includes an image reading unit for reading an image on an original and outputting image information representing the read image, an image forming unit for forming an image on a recording material based on the image information output from the image reading unit, and an operation unit detachably mountable on any one of the image reading unit and the image forming unit.

In one embodiment, the operation unit can operate both the image reading unit and the image forming unit whether the operation unit is mounted on the image reading unit or the image forming unit.

The foregoing and other objects, advantages and features of the present invention will become more apparent from the following detailed description of the preferred embodiments taken in conjunction with the accompanying drawings.

BRIEF DESCRIPTION OF THE DRAWINGS

FIGS. 1A–1D are diagrams illustrating an image forming apparatus according to a first embodiment of the present invention, as seen from four sides;

FIGS. 2A–2C are enlarged diagrams illustrating an operation-unit supporting mechanism used in the image forming apparatus shown in FIGS. 1A–1D, as seen from three sides;

FIGS. 3A–3P are diagrams illustrating various configurations obtained by combining units of the apparatus shown in FIGS. 1A–1D;

FIGS. 4A–4C are diagrams illustrating an image forming apparatus according to a second embodiment of the present invention, as seen from three sides;

FIGS. 6A–6P are diagrams illustrating various configurations obtained by combining units of the apparatus shown in FIGS. 4A–4C;

FIGS. 9A–9D are diagrams illustrating various other configurations obtained by combining units of the apparatus shown in FIG. 7;

DETAILED DESCRIPTION OF THE PREFERRED EMBODIMENTS

Preferred embodiments of the present invention will now be described with reference to the drawings.

Figure 7:
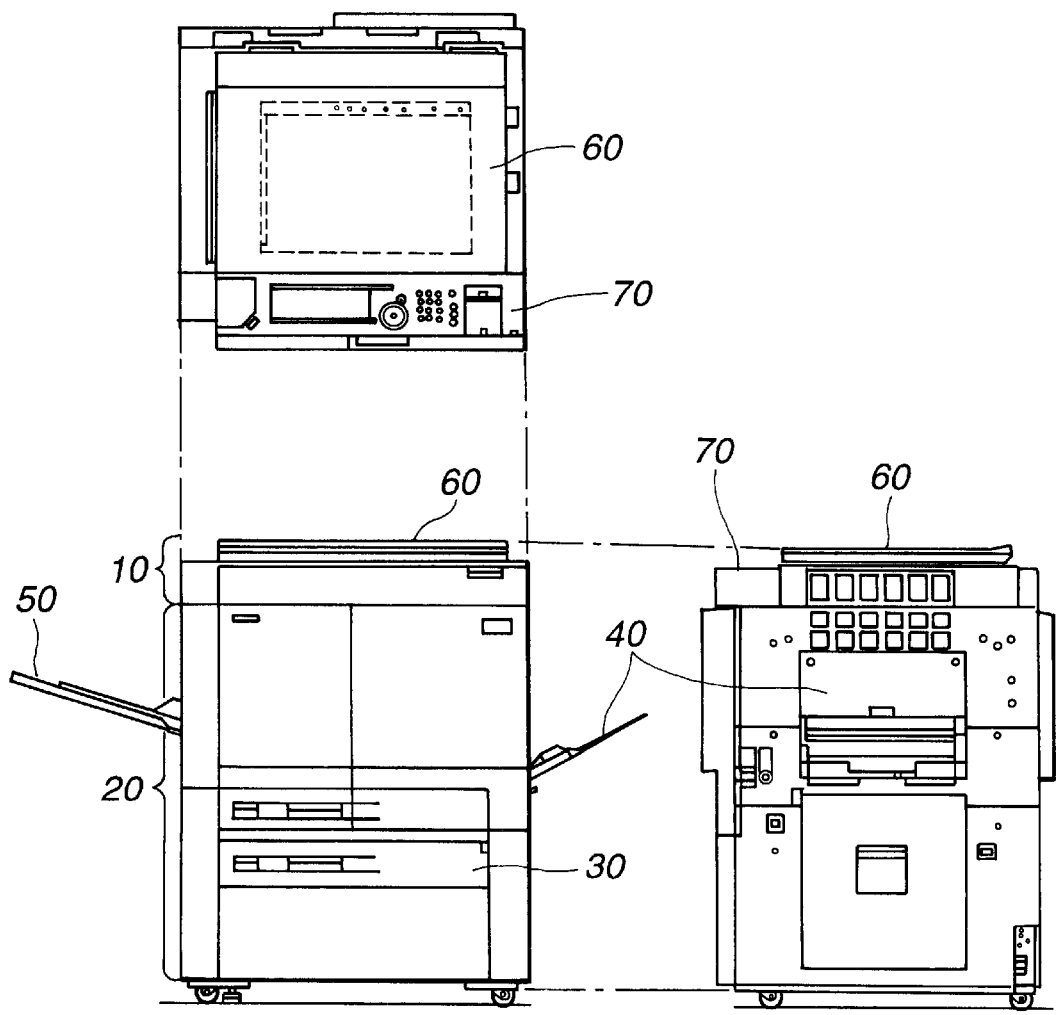
FIG. 7 is a diagram illustrating a conventional image forming apparatus, as seen from three sides.
Figures 8A, 8B, 8C:
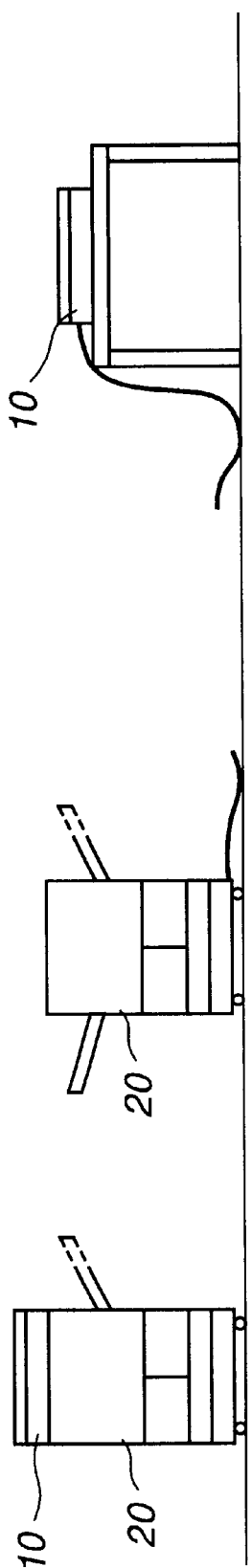
FIGS. 8A–8C are diagrams illustrating various configurations obtained by combining units of the apparatus shown in FIG. 7.

FIGS. 1A–1D are diagrams illustrating an image forming apparatus according to a first embodiment of the present invention, as seen from four sides: FIG. 1A is a front view as seen from the operator's side; FIG. 1B is a top plan view; FIG. 1C is a left side view; and FIG. 1D is a right side view. In FIGS. 1A–1D, reference numeral 1 represents an image reading unit, and reference numeral 2 represents an image forming unit. These units incorporate members necessary for image formation such as those briefly described with reference to FIG. 7.

When an original-pressing plate 6 provided on the top surface of the image forming apparatus is opened, an original is mounted on a platen-glass, and the apparatus is driven, the image reading unit 1 operates, and image information representing an image on the original is output. An image is formed on a recording material by the image forming unit 2 provided at a lower portion of the apparatus, based on the image information.

As is well known, in the image forming unit 2, an image is formed on a separately supplied recording material according to the operations of an image bearing member (not shown), and charging means, developing means, transfer means and the like disposed around the image bearing member. The recording material having the image formed thereon is discharged onto a discharged-sheet tray 5. Reference numeral 3 represents a sheet feeding cassette unit for accommodating sheets of the recording material, and reference numeral 4 represents a manual sheet feeding unit.

The operator instructs operations, such as on/off of the apparatus, selection of a copying mode, and the like, through an operation unit 7. The operation unit 7 includes an operation display panel for displaying the above-described various operations, jam removing processing, and the like.

In this apparatus, the operation unit 7 is independently provided, so that it is not fixed on the image reading unit 1 but is detachably mountable on a predetermined portion using a supporting member 8. In the case of FIGS. 1A–1D, the operation unit 7 is mounted on the image reading unit 1. Screw holes 9 are used for mounting the supporting member 8 of the operation unit 7 on the apparatus.

FIGS. 2A–2C are diagrams illustrating the supporting member 8 for mounting the operation unit 7 on the image forming apparatus, as seen from three sides: FIG. 2A is a top plan view, FIG. 2B is a front view, and FIG. 2C is a side view.

A method for supporting the operation unit 7 using the supporting member 8 will now be described in detail.

An end portion of a universal coupling member 27 is fitted between projections a and b provided on the operation unit 7 with an interval, a bolt 57 is threaded through an opening common to the projections a and b and the end portion of the universal coupling member 27, and an end portion of the bolt 57 is secured by a nut 47. The fastened state provided by the bolt 57 and the nut 47 is adjusted so that the operation unit 7 is usually maintained at a predetermined position and rotatable in the direction of a two-headed arrow A by applying a force exceeding a specific value.

A portion of the universal coupling member 27 extended to a side opposite the operation unit 7 is grasped between grasping portions c and d formed on one end of a supporting arm 37, and an opening common to the extended portion and the grasping portions is formed. The bolt 57 and the nut 47 are threaded through the opening so that the universal coupling member 27 and the supporting arm 37 are usually maintained at a predetermined position, and the operation unit 7 and the universal coupling member 27 are rotated in the direction of a two-headed arrow B when a force exceeding a specific value is applied.

A screw rod 67 whose portion g is screwed in the screw hole 9 provided in the main body of the apparatus is threaded through an opening formed in another end of the supporting arm 37, and the supporting arm 37 is maintained at an arbitrary fixed position with respect to the screw rod 67, i.e., with respect to the main body of the apparatus, or rotatable in the direction of an arrow C by the nut 47, as in the above-described manner. The supporting member 8 is configured by the above-described members 27, 37, 47, 57, 67, a, b, c, d, e, f and g.

As described above, since the image reading unit 1 and the image forming unit 2 are independently formed, this apparatus can be appropriately used in a copier configuration in which the image reading unit 1 and the image forming unit 2 are combined, in a printer configuration which does not include the image reading unit 1, or in a reader configuration which includes the image reading unit 1 but does not include the image forming unit 2. It is also possible to appropriately combine an automatic original-feeder and/or a sorter for automatically sorting copies with the above-described units.

FIGS. 3A–3P illustrate various configurations obtained by combining the image reading unit 1, the image forming unit 2, the operation unit 7, an automatic original-feeder 80 and a sorter 90 in the image forming apparatus.

FIGS. 3A–3H illustrate copier configurations in which the image reading unit 1 and the image forming unit 2 are stacked: FIGS. 3A and 3B illustrate standard copier configurations; each of FIGS. 3C and 3D illustrates a configuration in which the automatic original-feeder 80 is connected to the corresponding standard configuration shown in FIG. 3A or 3B; each of FIGS. 3E and 3F illustrates a configuration in which the sorter 90 is mounted on the corresponding configuration shown in FIG. 3A or 3B; and each of FIGS. 3G and 3H illustrates a configuration in which the automatic original-feeder 80 is mounted on the corresponding configuration shown in FIG. 3E or 3F.

Each of FIGS. 3I and 3J illustrates a standard printer configuration in which the image reading unit 1 is removed from the corresponding configuration shown in FIG. 3A or 3B. Each of FIGS. 3K and 3L illustrates a configuration in which the sorter 90 is mounted on the corresponding configuration shown in FIG. 3I or 3J. FIGS. 3M–3P illustrate reader configurations in which image information is output to an external apparatus, such as a computer, a printer or the like; FIGS. 3M and 3N illustrate standard configurations; and each of FIGS. 3O and 3P illustrates a configuration in which the automatic original-feeder 80 is mounted on the corresponding configuration shown in FIG. 3M or 3N.

The operation unit 7 is disposed at the right side and at the left side of the image reading unit 1 in FIGS. 3A, 3C, 3E, 3G, 3M and 3O, and in FIGS. 3B, 3D, 3N and 3P, respectively, and is disposed at the right side and at the left side of the image forming unit 2 in FIGS. 3I and 3K, and in FIG. 3J, respectively.

Although in FIGS. 3F, 3H and 3L, the operation unit 7 is shown in broken lines at the left side of the image reading unit 1 or the image forming unit 2, it can be understood that the operation unit 7 cannot be disposed there because the sorter 90 is provided at the left side of the main body of the apparatus. The sorter 90 in the foregoing description is assumed to have substantially the same height as the image reading unit 1 in consideration of the function of the sorter 90. However, if a sorter lower than the height up to the image forming unit 2 can be utilized, the configurations shown in FIGS. 3F and 3H can be realized. Even in this case, however, since the configuration shown in FIG. 3L cannot be realized, it is necessary to mount the operation unit 7 to the right side.

As described above, by adopting the same mechanical configuration for a detachable mounting portion of an operation unit with respect to an image forming unit and a detachable mounting portion of the operation unit with respect to an image reading unit so that the operation unit can be mounted on a plurality of portions and the position where the operation unit is mounted can be selected, the operability of the apparatus at the position where the operator is standing is improved even if the size of the operation unit is large.

It is preferable that the shape of an electrical connector unit between the image forming unit and the operation unit and the shape of an electrical connector unit between the image reading unit and the operation unit are the same.

Next, a description will be provided of information transmission when the operator performs a copying operation by inputting an instruction for the copying operation through the operation unit in the above-described copier, printer or reader configuration.

First, a state of connection, and information transmission in each of conventional configurations serving as a comparative example for the first embodiment will be described with reference to FIG. 10.

Figure 10:
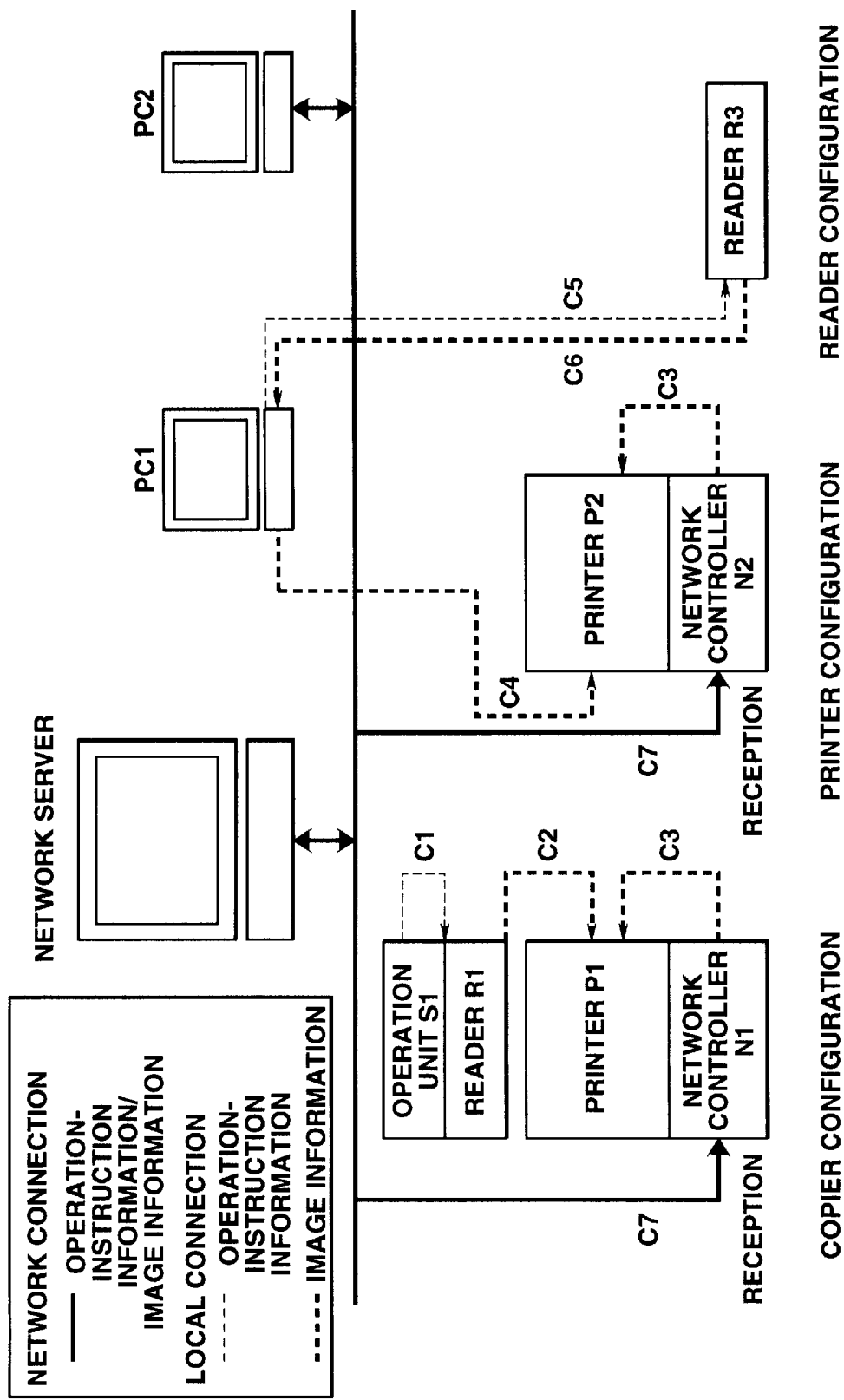
FIG. 10 is a diagram illustrating a state of connection, and information transmission in a comparative example.

In a copier configuration shown in FIG. 10, an operation unit S1, a reader R1 for reading an image on an original, a printer P1 for forming an image on a recording material, and a network controller N1 are locally connected by local communication means. In a printer configuration shown in FIG. 10, a printer P2 and a network controller N2 are locally connected by local communication means. In a reader configuration shown in FIG. 10, a reader R3 is locally connected by local communication means to a computer PC1.

The operation unit S1 is used when the operator inputs an instruction for a copying operation. The copying operation indicates an operation of reading an image on an original by a reader, and forming an image on a recording material by a printer based on image information representing the image read by the reader, i.e., an operation of forming the image on the recording material using both the reader and the printer.

A description will now be provided of a state of connection, and information transmission in each of the conventional configurations.

(1) When the Operator Inputs an Instruction for a Copying Operation to the Operation Unit in the Copier Configuration When the operator has input an instruction for the copying operation to the operation unit P1, information relating to the copying-operation instruction is transmitted from the operation unit S1 to the reader R1 (c1), and reading of an image on an original is started. Image information representing the image read by the reader R1 is transmitted to the printer P1 according to local communication means (c2), and an image is formed on a recording material.

(2) When the Operator Prints an Image Represented by Image Information Stored in the Computer PC1

When the operator has input an instruction to print an image represented by the image information stored in the computer PC1 to the computer PC1, the image information is transmitted from the computer PC1 to the printer P2 according to local communication means (c4), and an image is formed on a recording material.

(3) When the Operator Stores Image Information Representing an Image on an Original Into the Computer PC1

When the operator has input an instruction to read an image on an original to the computer PC1, information relating to the instruction to read the image is transmitted from the computer PC1 to the reader R3 (c5), and image reading is started. Image information representing the image read by the reader R3 is transmitted to the computer PC1 according to local communication means (c6), and is stored in the computer PC1.

(4) When the Operator Prints an Image Represented by Image Information Stored in the Computer PC1 Via a Network Server When the operator has input an instruction to print an image represented by image information stored in the computer PC2 to the computer PC2, the image information is transmitted from the computer PC2 to the network controller N2 in the printer configuration or to the network controller N1 in the copier configuration via the network server according to network communication means (c7). The image information received by the network controller is transmitted to the printer P1 or P2 according to local communication means (c3), and an image is formed on a recording material.

It is impossible to transmit information from the network controller N1 or N2 to another configuration according to network communication means.

Next, a description will be provided of a state of connection, and information transmission when the operator has input an instruction for a copying operation to an operation unit, in a copier configuration, a printer configuration or a reader configuration according to the first embodiment with reference to FIGS. 11, 12, 13 and 14.

In FIGS. 11, 12, 13 and 14, the same states of connection as those shown in FIG. 10 are indicated by the same reference numerals.

The first embodiment differs from the above-described comparative example in that operation-instruction information can be transmitted from an operation unit S4 to a network controller N4 (c8), operation-instruction information can be transmitted from the network controller N4 to a reader R4 (c9), image information can be transmitted from the reader R4 to the network controller N4 (c10), and operation-instruction information and image information can be transmitted from the network controller N4 to a network server (c11).

In each of the configurations, the operation unit S4 used when the operator inputs instructions for a copying operation is detachable.

The copying operation in the first embodiment indicates an operation of reading an image on an original by a reader, and forming an image on a recording material by a printer based on image information representing the image read by the reader, i.e., an operation of forming the image on the recording material using both the reader and the printer.

Figure 11:
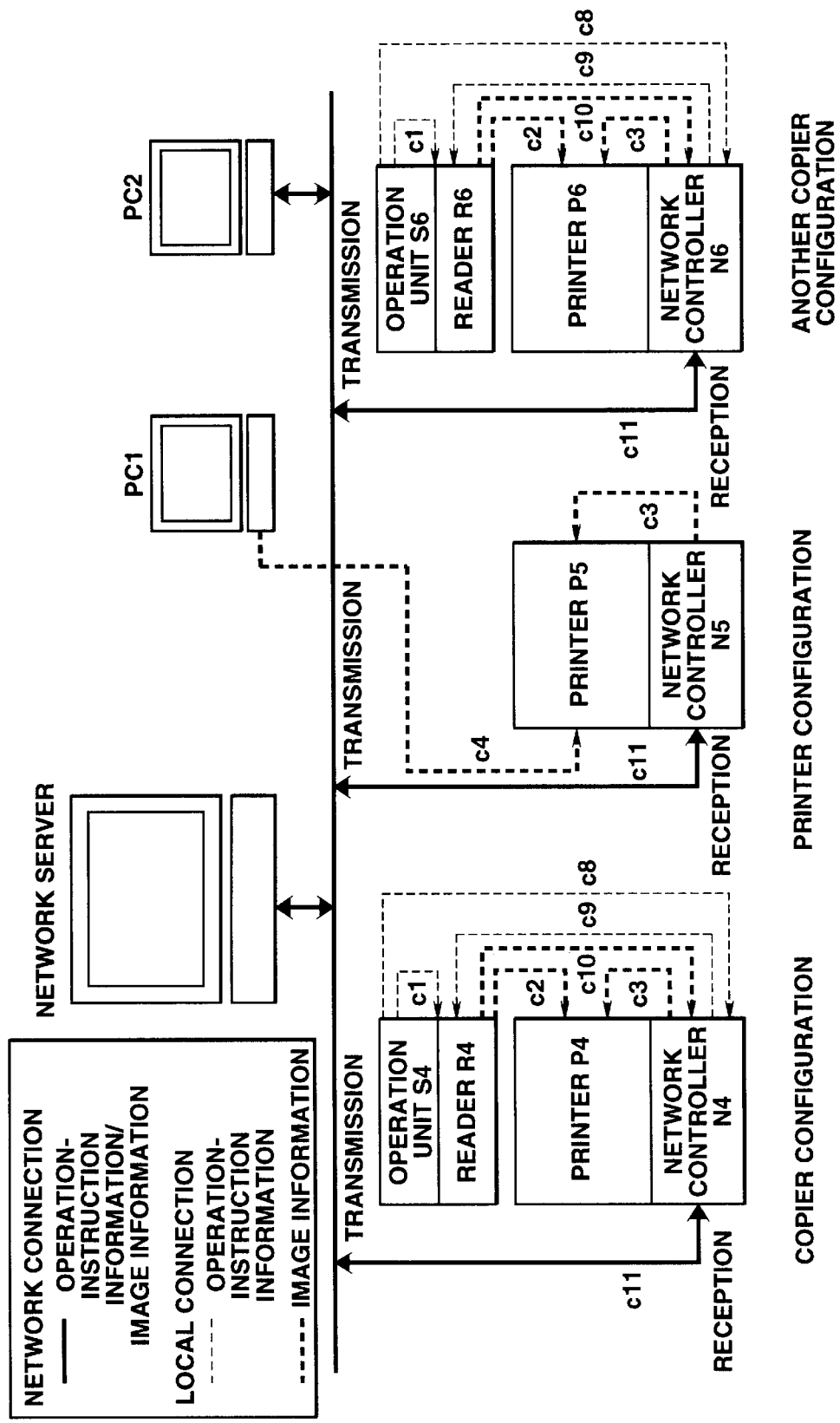
FIG. 11 is a diagram illustrating a state of connection, and information transmission in a copier configuration in the first embodiment.
Figure 12:
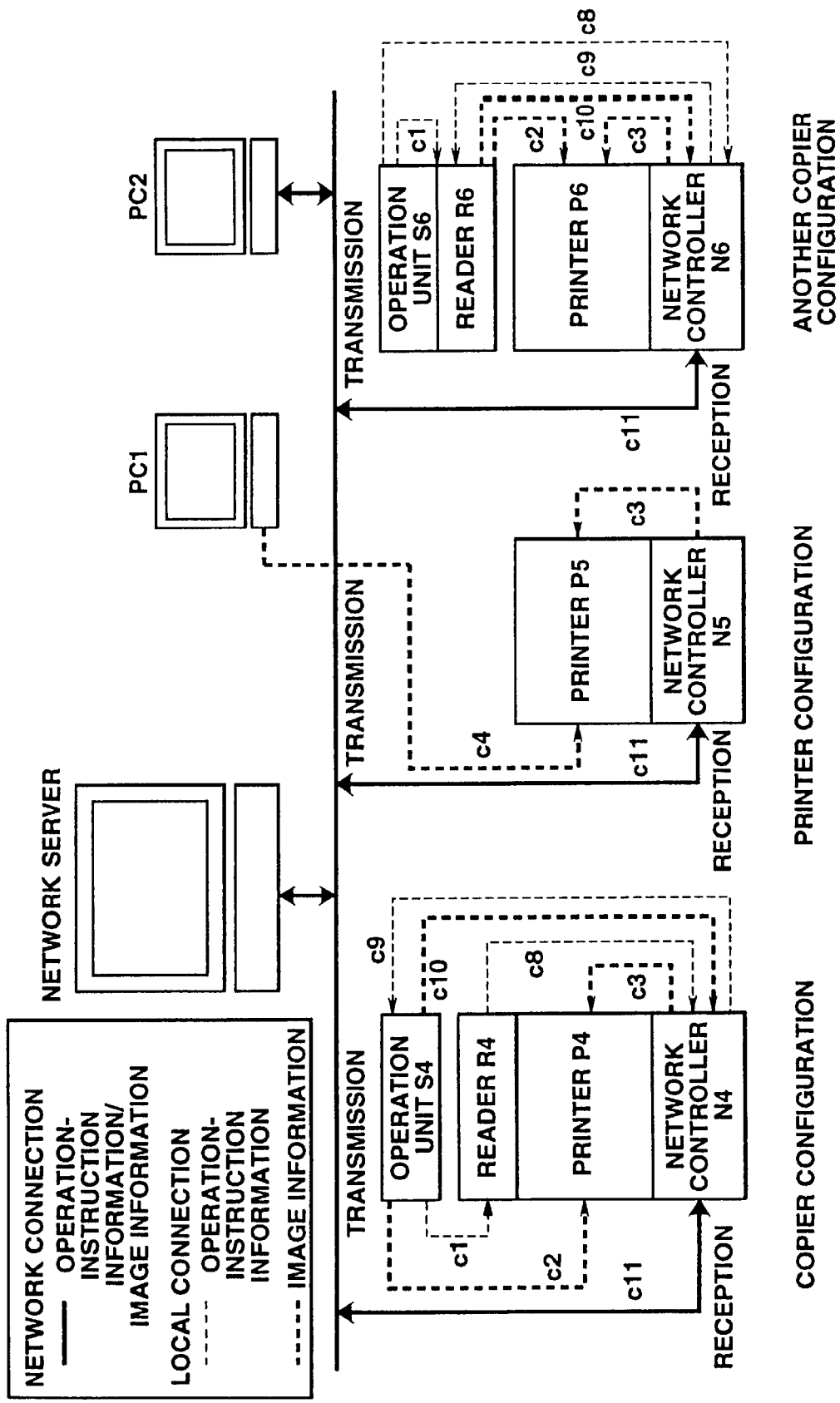
FIG. 12 is a diagram illustrating a state of connection, and information transmission in a copier configuration, in which an operation unit is mounted on a printer, in the first embodiment.

Each of FIGS. 11 and 12 is a diagram illustrating a state of connection, and information transmission in a copier configuration in which the operation unit S4, the reader R4 for reading an image on an original, a printer P4 for forming an image on a recording material, and the network controller N4 are locally connected by local communication means. In FIG. 12, the operation unit S4, the reader R4, the printer P4 and the network controller N4 which are the same as those in FIG. 11 are used.

In the copier configuration shown in FIG. 11, the operation unit S4 is mounted on the image reading unit, and in the copier configuration shown in FIG. 12, the operation unit S4 is mounted on the image forming unit.

Figure 13:
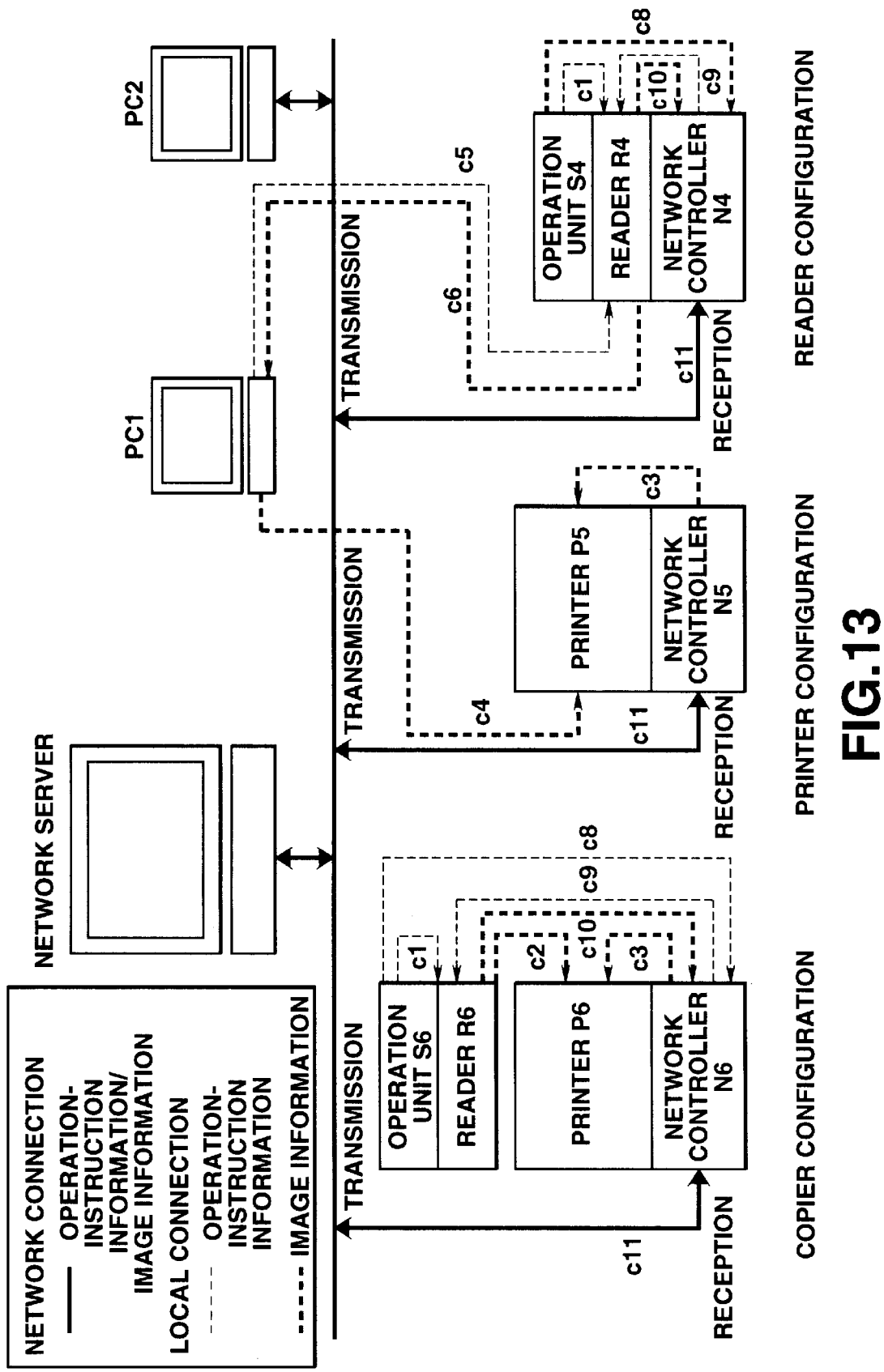
FIG. 13 is a diagram illustrating a state of connection, and information transmission in a reader configuration in the first embodiment.

FIG. 13 is a diagram illustrating a state of connection, and information transmission in a reader configuration in which the reader R4, the operation unit S4 and the network controller N4 that are the same as those in FIG. 11 are locally connected by local communication means.

Figure 14:
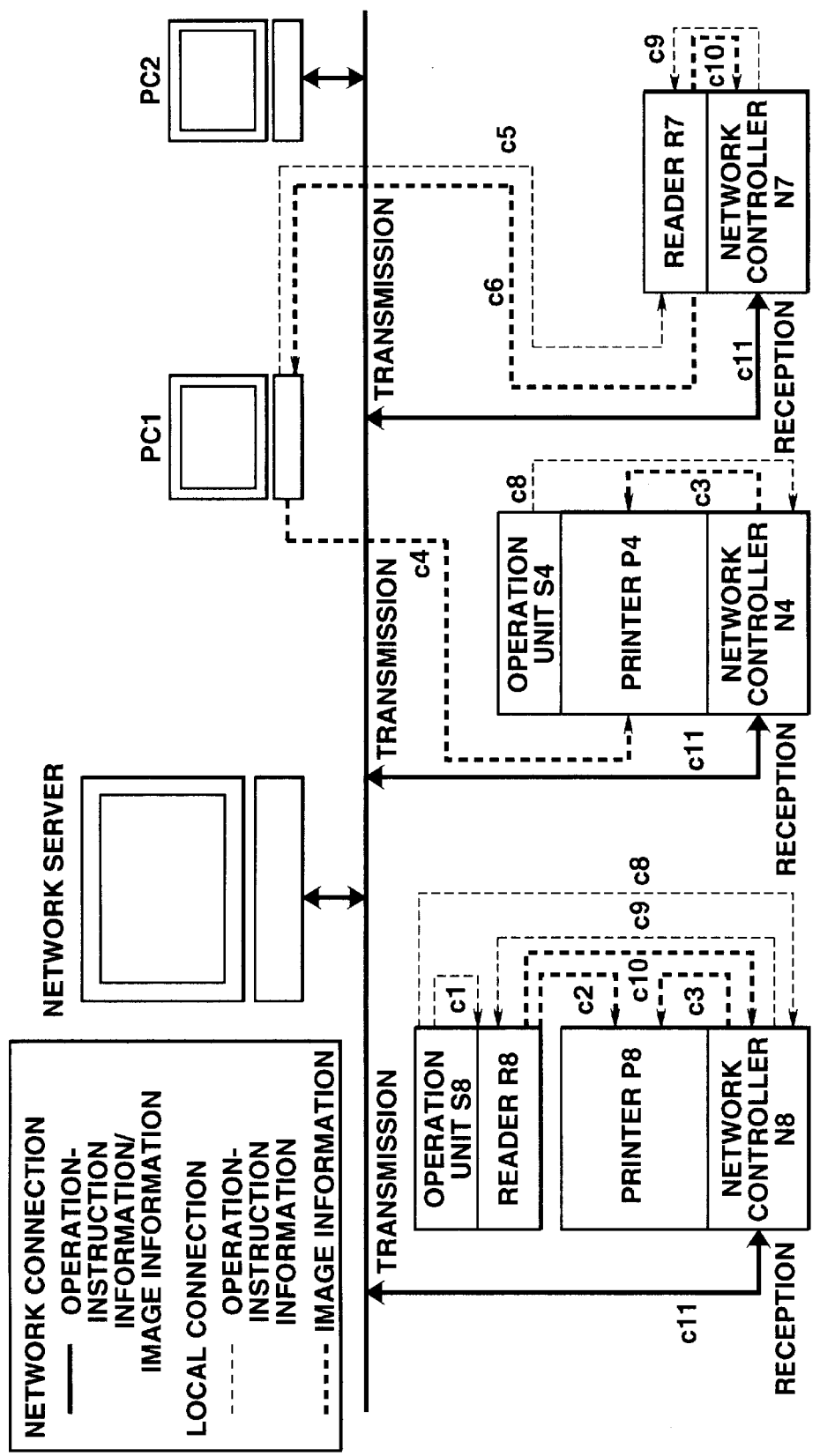
FIG. 14 is a diagram illustrating a state of connection, and information transmission in a printer configuration in the first embodiment.

FIG. 14 is a diagram illustrating a state of connection, and information transmission in a printer configuration in which the printer P4, the operation unit S4 and the network controller N4 that are the same as those in FIG. 11 are locally connected by local communication means.

A description will now be provided of a state of connection, and information transmission when the operator performs a copying operation by inputting an instruction for the copying operation to the operation unit S4 in each of these configurations.

(1) When the Operation Unit is Mounted on an Image Reading Unit in a Copier Configuration A description will be provided with reference to FIG. 11.

When the operator has input an instruction for a copying operation to the operation unit S4, information relating to the instruction for the copying operation is transmitted from the operation unit S4.

The copying-operation-instruction information transmitted from the operation unit S4 is transmitted to the reader R4 by local communication means (c1), and image reading by the reader R4 is started. Image information representing an image read by the reader R4 is transmitted to the printer P4 by the local communication means (c2). The printer P4 forms an image on a recording material based on the image information transmitted from the reader R4, and discharges the recording material having the image formed thereon to the outside of the printer P4.

When the operator has input an instruction to perform image formation on a recording material by a printer P5 in the printer configuration or by a printer P6 in the copier. configuration to the operation unit S4, information relating to the instruction for the copying operation transmitted from the operation unit S4 is transmitted to the reader R4 by the local communication means (c1), and image reading by the reader R4 is started. The copying-operation-instruction information is also transmitted to the network controller N4 by the local communication means (c8), and preparation for network communication is performed. Image information representing an image read by the reader R4 is transmitted to the network controller N4 by the local communication means (c10). The image information transmitted from the reader R4 to the network controller N4 is further transmitted to a network controller N5 in the printer configuration or to a network controller N6 in another copier configuration via a network server by network communication means (c11). Then, the image information is transmitted to the printer P5 or P6 by the local communication means (c3), and an image represented by the image information is formed on a recording material.

(2) When the Operation Unit is Mounted on an Image Forming Unit in a Copier Configuration A description will be provided with reference to FIG. 12.

When the operator has input an instruction for a copying operation to the operation unit S4, information relating to the instruction for the copying operation is transmitted from the operation unit S4.

The copying-operation-instruction information transmitted from the operation unit S4 is transmitted to the reader R4 by local communication means (c1), and image reading by the reader R4 is started.

Image information representing an image read by the reader R4 is transmitted to the printer P4 by the local communication means (c2). The printer P4 forms an image on a recording material based on the image information transmitted from the reader R4, and discharges the recording material having the image formed thereon to the outside of the printer P4.

When the operator has input an instruction to perform image formation on a recording material by the printer P5 in the printer configuration or by the printer P6 in another copier configuration to the operation unit S4, information is transmitted in the following manner.

Information relating to the instruction for the copying operation transmitted from the operation unit S4 is transmitted to the network controller N4 and the reader R4 by the local communication means (c1, c10), and image reading by the reader R4 is started. Image information representing an image read by the reader R4 is transmitted to the network controller N4 by the local communication means (c8). Then, the image information is further transmitted to the network controller N5 in the printer configuration or to the network controller N6 in the other copier configuration via the network server by the network communication means (c11), and to the printer P5 or P6 by the local communication means (c3), and an image represented by the image information is formed on a recording material.

(3) When the Operation Unit is Mounted on an Image Reading Unit in a Reader Configuration A description will be provided with reference to FIG. 13.

When the operator has input an instruction for a copying operation to the operation unit S4, information relating to the instruction for the copying operation is transmitted from the operation unit S4.

The copying-operation-instruction information transmitted from the operation unit S4 is transmitted to the reader R4 by local communication means (c1), and image reading by the reader R4 is started. Image information representing an image read by the reader R4 is transmitted to the network controller N4 by the local communication means (c10). The image information transmitted from the reader R4 to the network controller N4 is further transmitted to the network controller N5 in the printer configuration or to the network controller N6 in another copier configuration via a network server by network communication means (c11). Then, the image information is transmitted to the printer P5 or P6 by the local communication means (c3), and an image represented by the image information is formed on a recording material.

(4) When the Operation Unit is Mounted on an Image Forming Unit in a Printer Configuration A description will be provided with reference to FIG. 14.

When the operator has input an instruction for a copying operation to the operation unit S4, information relating to the instruction for the copying operation is transmitted from the operation unit S4.

The copying-operation-instruction information transmitted from the operation unit S4 is transmitted to the network controller N4 by local communication means (c8). The copying-operation-instruction information transmitted from the operation unit S4 to the network controller N4 is further transmitted to a network controller N7 in the reader configuration via a network server by network communication means (c11). Then, the copying-operation-instruction information is transmitted to a reader R7 in the reader configuration by the local communication means (c9), and image reading by the reader R7 is started.

Image information representing an image read by the reader R7 is transmitted to the network controller N7 by the local communication means (c10), and is then transmitted to the network controller N4 in the printer configuration via the network server by the network communication means (c11). Then, the image information is transmitted to the printer P4 in the printer configuration by the local communication means (c3), and an image represented by the image information is formed on a recording material.

When the operator has input an instruction to the operation unit S4 so that image formation on a recording material is to be performed by a printer P8, information is transmitted in the following manner.

Information relating to an instruction for a copying operation provided from the operation unit S4 is transmitted to the network controller N4 by the local communication means (c8), and is then transmitted to a network controller N8 in the copier configuration via the network server by the network communication means (c11). Then, the copying-operation-instruction information is transmitted to a reader R8 in the copier configuration by the local communication means (c9), and image reading by the reader R8 is started. Image information representing an image read by the reader R8 is transmitted to the printer P8 by the local communication means (c2). The printer P8 forms an image on a recording material based on the image information transmitted from the reader R8, and discharges the recording material having the image formed thereon to the outside of the printer P8.

The above-described printer configuration and copier configuration including the network controllers N5 and N6 may be replaced by the conventional printer configuration and copier configuration including the network controllers N1 and N2 which cannot transmit information. In this case, however, an operation environment limited to a reception function is provided.

As described above, according to the first embodiment, it is possible to perform a copying operation whether the operation unit S4 is mounted on an image reading unit in a copier configuration, on an image reading unit in a reader configuration, on an image forming unit in a copier configuration, or on an image forming unit in a printer configuration.

This is because a state of connection is provided so as to transmit information relating to an operation instruction through the operation unit S4 to a unit where the operation unit S4 is not mounted.

As described above, the operation unit of the first embodiment can be detachably mounted to any one of the image forming unit and the image reading unit, and it is possible to perform a copying operation whether the operation unit is mounted on the image forming unit or the image reading unit. Hence, an appropriate one of the image reading unit and the image forming unit can be selected as a position where the operation unit is mounted in accordance with the operator's conditions, such as the operator's height and the like, and it is possible to provide a product having an excellent operability whether the operator' height is large or small.

Furthermore, even if one of the image forming unit and the image reading unit is not used, for example, in a printer configuration or a reader configuration, an instruction for a copying operation can be performed through an operation unit in each configuration using network communication means c11, serving as two-way communication information transmission means. Hence, it is possible to mount an operation unit common to a copier configuration, a printer configuration and a reader configuration, and to reduce the production cost compared with the conventional case in which a dedicated operation unit is provided for each configuration.

A second embodiment of the present invention will now be described with reference to FIGS. 4A–4C, FIGS. 5A–5C, and FIGS. 6A–6P.

FIGS. 4A–4C are diagrams illustrating an image forming apparatus according to the second embodiment, as seen from three sides; FIG. 4A is a front view as seen from the operator; FIG. 4B is a top plan view; and FIG. 4C is a side view as seen from the left side. In FIGS. 4A–4C, the same components as those shown in FIGS. 1A–1D are indicated by the same reference numerals, and further description thereof will be omitted.

In this apparatus, as in the apparatus of the first embodiment, an operation unit 7 is configured independent of an image reading unit 1 and an image forming unit 2, and can be detachably mounted on the top surface of the image reading unit 1 or the image forming unit 2. The apparatus of the second embodiment differs from the apparatus of the first embodiment in that a supporting member 11 is provided. A supporting method by the supporting member 11 will now be described in detail.

Figure 5A:
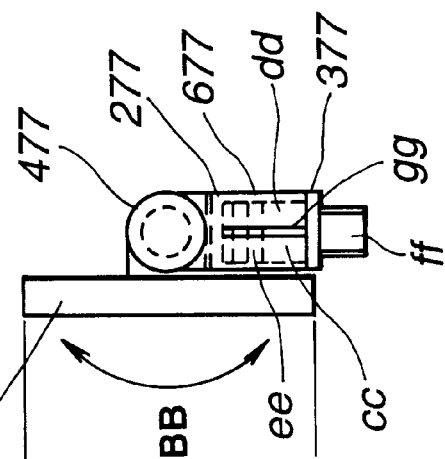
FIGS. 5A–5C are enlarged diagrams illustrating an operation-unit supporting mechanism used in the image forming apparatus shown in FIGS. 4A–4C, as seen from three sides.
Figure 5B:
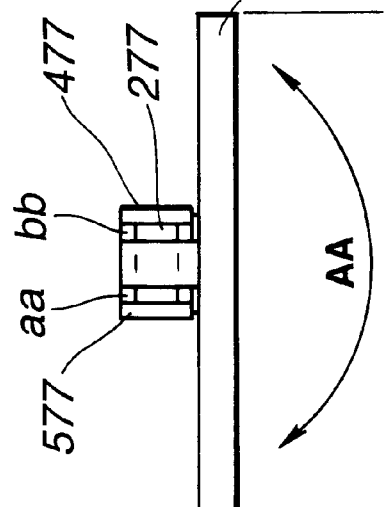
Figure 5C:
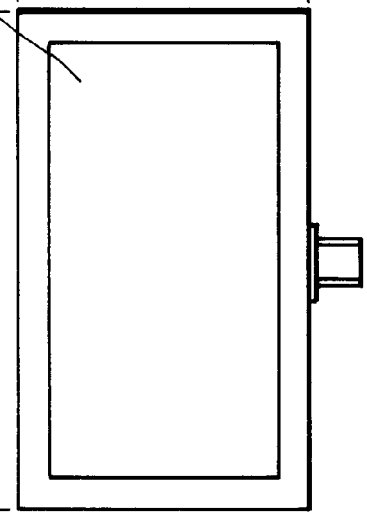

FIGS. 5A–5C illustrate the operation unit 7 and means for mounting the operation unit 7 on the image forming apparatus. A projection is formed on the operation unit 7, a bolt 577 is threaded through an opening common to grasping portions aa and bb of an arm 277 provided so as to grasp the projection, and the projection and the grasping portions aa and bb are secured by a nut 477. The operation unit 7 usually maintains a predetermined position with respect to the arm 277, and is rotatable in the direction of an arrow BB when a force exceeding a specific value is applied.

The arm 277 is fitted in a mounting base 377 in a state of being prevented from being detached by engaging a screw 677 threaded through the arm 277 with a groove provided in a circumferential direction of a mounting bolt portion ee. A slit gg provided in the arm 277 is opened according to the above-described fitting, and the operation unit 7 is usually maintained at a predetermined position with respect to the mounting base 377 by the elastic force in this state, and is rotatable in the direction of an arrow AA when a force exceeding a specific value is applied. By integrally forming the operation unit 7, the arm 277 and the mounting base 377, and screwing a screw portion ff of the mounting base 377 in a screw hole 9 provided in the image reading unit, the image forming unit or the like, it is possible to appropriately mount the operation unit 7 in accordance with the configuration of the image forming apparatus.

In the image forming apparatus, the image reading unit 1, the image forming unit 2 and the operation unit 7 are independently provided so as to allow a copier configuration, a printer configuration and a reader configuration. In addition, an automatic original-feeder 80 and a sorter 90 can be appropriately mounted. Hence, these units may be appropriately combined. FIGS. 6A–6P illustrates configurations obtained by various combining these units.

FIGS. 6A–6H illustrate copier configurations: FIGS. 6A and 6B illustrate standard copier configurations; each of FIGS. 6C and 6D illustrates a configuration in which the automatic original-feeder 80 is mounted; each of FIGS. 6E and 6F illustrates a configuration in which the sorter 90 is mounted; and each of FIGS. 6G and 6H illustrates a configuration in which the automatic original-feeder 80 and he sorter 90 are mounted.

FIGS. 6I–6L illustrate printer configurations: FIGS. 6I and 6J illustrate standard configurations; and each of FIGS. 6K and 6L illustrates a configuration in which the sorter 90 is mounted.

FIGS. 6M–6P illustrate reader configurations; FIGS. 6M and 6N illustrate standard configurations; and each of FIGS. 6O and 6P illustrates a configuration in which the automatic original-feeder 80 is mounted.

The operation unit 7 is disposed at an upper right portion and at an upper left portion of the image reading unit 1 in FIGS. 6A, 6C, 6E, 6G, 6M and 6O, and in FIGS. 6B, 6D, 6F, 6H, 6N and 6P, respectively, and is disposed at an upper right portion and at an upper left portion of the image forming unit 2 in FIGS. 6I and 6K, and in FIG. 6J, respectively. In the case of FIG. 6L, it is difficult to mount the operation unit 7 because the height of the sorter 90 is large. In this case, a low sorter may be used, or when an insufficient function is provided if a lower sorter is used, the operation unit 7 may be mounted on an upper right portion (not shown).

The second embodiment may adopt the same state of connection as in the first embodiment, and has the same effects as the first embodiment.

The individual components shown in outline or designated by blocks in the drawings are all well known in the operation unit and image forming apparatus arts and their specific construction and operation are not critical to the operation or the best mode for carrying out the invention.

While the present invention is described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An operation unit for inputting instructions for operation of an image reading unit for reading an image on an original and outputtting image information representing the image read by said image reading unit, and for operation of an image forming unit for forming an image on a recording material based on the image information, said operation unit comprising:

a connection unit selectively connectable to either one of said image reading unit and said image forming unit.

2. An operation unit according to claim 1, further comprising a display unit for displaying a type of operation to be performed.

3. An image forming apparatus comprising:

an image reading unit for reading an image on an original and outputting image information representing the image read by said image reading unit;

an image forming unit for forming an image on a recording material based on image information output from said image reading unit; and an operation unit selectively and detachably mountable on either one of said image reading unit and said image forming unit.

4. An image forming apparatus according to claim 3, wherein said operation unit is operable by a user to input instructions for operation of both said image reading unit and said image forming unit when said operation unit is mounted on either said image reading unit or said image forming unit.

5. An image forming apparatus according to claim 3, further comprising information transmission means for transmitting information from said image forming unit to said image reading unit.

6. An image forming apparatus according to claim 3, wherein a mounting portion of said image reading unit for mounting said operation unit and a mounting portion of said image forming unit for mounting said operation unit have the same mechanical configuration.

7. An image forming apparatus according to claim 3, wherein an electric connector portion of said image reading unit for connecting said operation unit to said image reading unit and an electric connector portion of said image forming unit for connecting said operation unit to said image forming unit have the same shape.

8. An image forming apparatus according to claim 3, wherein said image reading unit and said image forming unit are separable from each other and independently operable.

9. An image forming apparatus according to claim 3, wherein said operation unit provides an operation instruction for said image forming apparatus input by a user.

10. An image forming apparatus according to claim 3, wherein said operation unit comprises a display unit for displaying a type of operation to be performed.

* * * * *